United States Patent Office 3,273,643
Patented Sept. 20, 1966

3,273,643
METHOD OF INITIATING FOAM IN DROWNED WELLS
William E. Billings and Reginald M. Lasater, Duncan, Okla., assignors to Halliburton Company, Duncan, Okla., a corporation of Delaware
No Drawing. Filed Jan. 24, 1964, Ser. No. 339,886
17 Claims. (Cl. 166—45)

The present invention relates to a method for removing liquids and solids from oil or gas wells which have become "drowned" because of the production of water or because of the introduction of water into the well. More particularly, the present invention relates to a method of initiating foam in drowned wells.

The removal of undesirable water from oil and gas wells has long been recognized as a troublesome problem by workers in the art. In many cases, it has been found that wells have produced sufficient water to seriously hamper or even terminate production. In addition, many wells contain solids such as rust, clays, drilling muds and other foreign materials which interfere with efficient operation. These materials, particularly water, have sometimes been removed from the well bore by pumping, siphons or other mechanical means. However, such methods are expensive, time-consuming, and often lead to a large amount of waste of gas or oil in their operation.

In addition, more recent suggestions have been made that foam forming materials could be used to remove the unwanted water by lightening the liquid column to such an extent that even small reservoir pressures are capable of lifting the resultant foam column to the surface where it is expelled from the well. However, the previously suggested methods have suffered from several serious disadvantages. Some such methods rely upon the gas being produced in the well to form the foam. Obviously, these methods are not suitable for wells which produce no gas or insufficient gas to cause the required foaming. Other methods have been suggested in which foam initiators have been proposed. For example, metal hydrides, acid-carbonate mixtures and calcium carbide have been advanced as possibly suitable foam initiators. However, hydrides liberate hydrogen which is flammable, acid-carbonate mixtures release carbon dioxide which is relatively highly soluble in water and oil and calcium carbide releases acetylene, which is both flammable and relatively highly soluble. The present invention obviates the difficulties encountered in the prior art methods.

It is a primary object of the present invention to provide a method for removing liquids from wells and the like which comprises adding a foam initiator and foaming agent to the liquid in the well.

It is another object of the present invention to provide a process for removing liquids from wells and the like which comprises adding a foaming agent and a foam initiator composition which is capable of liberating nitrogen gas to the liquid in the well.

It is a further object of the present invention to provide a process for removing liquids from wells and the like which comprises adding a foaming agent and a foam initiator such as sulfamic acid, amino acids, primary amines or amides in combination with nitrous acid to the liquid.

Other objects and advantages of the present invention, it is believed, will be apparent from the following detailed description of specific embodiments thereof.

Briefly, the present invention comprises adding a foaming agent and a foam initiator comprising sulfamic acid, a primary amine, an amide or an amino acid in combination with nitrous acid to a liquid which it is desired to remove from a well bore. Preferably, a nitrite salt is used as the source of the nitrous acid. When this is done, and the nitrogen-containing compound is an amine or an amide, it is necessary to add an acid to the composition to produce nitrous acid. Any acid may be used for this purpose, but it is preferred to use acids which will not cause corrosion or other problems. Thus, acids such as citric, hydroxyacetic, trichloroacetic, oxalic and gluconic are preferred as compared with acids such as hydrochloric and sulfuric.

Sulfamic acid and amino acids do not require additional acid since they are sufficiently acidic themselves. Thus, these compositions may be considered "double-reacting" since they provide both acidic hydrogen ions and an $NH_2$ group for reaction with the nitrous acid.

Numerous foaming agents may be used in the present invention. For example, polyoxyethylated alkyl phenols such as Triton X–102 and Triton X–165 marketed by Rohm and Haas Company; alkyl aryl polyethylene glycol ether detergents such as Igepals marketed by General Aniline and Film Corporation; reaction products of ethylene oxide with fatty acid amides marketed as Ethomid by Armour and Company; condensation products of ethylene oxide with a propylene oxide-propylene glycol reaction product marketed as Pluronics by Wyandotte Chemical Corporation are typical non-ionic surface active agents which may be used. In general, non-ionic foaming agents are preferred since they have substantially no tendency to react with subterranean brines. However, anionic surface agents such as Triton QS–15 or cationic surface active agents such as the Arquads marked by Armour and Company may be used. Licorice extracts and protein hydrolyzates may also be used. Of course, many other foaming agents may be used, e.g., those disclosed on pages 12 and 13 of United States Bureau of Mines Monograph 11 entitled, "Using Foaming Agents to Remove Liquids From Gas Wells," by Dunning, Eakin and Walker, the disclosure of which is incorporated herein by reference.

Similarly, a wide variety of foam initiating materials may be used in the present invention. Among the primary amines which may be used are alkyl amines such as ethyl amine, propyl amine and hexyl amine, alkylene amines such as ethylene diamine and propylene diamine, alkanol amines such as monoethanolamine, N-aminoethyl ethanolamine, monoisopropanolamine and polygycolamine and aryl amines such as N-aminophenylmethylcarbinol, methylbenzylamine, aniline and o-toluidine. Among the amides which may be used are acetamide, propionamide, formamide and butyramide. The amino acids used in the present invention should be water soluble amino acids which possess a primary amino group, e.g., glycine, alanine, valine, phenylalanine and glutamic acid. As previously mentioned, it is preferred to use an inorganic nitrite salt as the source of the nitrous acid used in the present invention. Typical nitrite salts are sodium nitrite, potassium nitrite, and calcium nitrite. However, any nitrite salt which will function as a source of nitrous acid may be used.

In practice, enough foaming agent should be introduced into the well to produce a strong foam. In general, a concentration of at least about 0.01% has been found to be satisfactory. The foaming agent may be diluted with water, brine or organic solvents for introduction into the well bore. Proportions of foaming agent and solvent may be varied within a broad range, so long as the viscosity of the mixture is kept low enough to enable it to flow readily into the well. In general, the solvent may vary from 10 to 90%, with a range of 50 to 70% being preferred in many cases. Alcohol has been found to be a convenient organic solvent. It has also been found desirable in many cases to first introduce the solution of foaming agent into the well and then wash it down with water.

The foam initiating reactants may then be added. This is preferably accomplished by packaging the nitrite salt and nitrogen-containing compound in the same or in separate watersoluble containers and dropping them into the well. The watersoluble containers function to prevent reaction between the nitrite and the nitrogen-containing composition until these materials are at the desired depth in the well which will usually be at or near the bottom of the well. Other suitable means for delaying the reaction between the nitrogen-containing composition and the nitrite may be used e.g., adding these compositions in the same or separate breakable containers and then breaking the containers when they have reached the desired depth.

When the nitrogen-containing composition is an amide or primary amine, the additional acid which is needed to react with the nitrite to form nitrous acid may be added separately or may be combined with the nitrogen-containing material.

When the nitrous acid and nitrogen-containing composition react, nitrogen gas is evolved which initiates foaming of the foaming agent. When this occurs, the foam in the well bore rises and overflows from the top of the well, thereby removing the unwanted water or other liquid which comprises the continuous phase of the foam. This foam also functions to remove particulate solid material from the well bore which is often highly desirable.

In general, it has been found that the concentration of foam initiating material should be from about 50 p.p.m. to about 5,000 p.p.m. However, it will be readily apparent to those skilled in the art that these limits may be varied depending upon the actual conditions which are encountered in the well. This is particularly true of the upper limit which may be raised to any level necessary to accomplish effective removal of the unwanted water or other liquid in the well. Since the nitrous acid and nitrogen-containing material react stoichiometrically, it is preferred that they be present in an equimolar ratio with respect to the amine group since one mole of nitrous acid will react with one mole of available amine or amide. Similarly, when primary amines or amides are used as the nitrogen-containing compound, it is preferred that the hydorgen ions of the additional acid, e.g., acetic acid, be added on an equimolar basis with respect to the nitrite group in the nitrite salt. However, an excess of any reactant will not hinder the operation of the present invention, but will only result in a certain amount of waste to the extent that the excess of a given reactant does not react. Furthermore, given the concept of the present invention, only routine experimentation will be required to determine suitable concentrations and proportions of the materials used.

Although the present invention is particularly useful for removing undesired water or other liquids from subterranean wells, it may also be used to clean pipes, tanks and the like by generating a foam therein which will overflow and sweep out debris and solid material.

The present invention is further illustrated by the following examples, but is not to be considered to be limited to the specific details thereof. In each of these examples, the foaming agent used was a product sold commercially under the name "Howco-Suds" which is believed to comprise a nonionic surfactant. The tests described in these examples were conducted according to the "Standard Dynamic Foam Test," described in the Bureau of Mines Monograph 11 referred to above.

Example I

An aqueous solution containing 0.1% foaming agent was prepared. A foam initiator composition comprising 6.9 grams sodium nirite and 9.7 grams sulfamic acid was then sealed in a water-soluble bag comprising polyvinyl alcohol. The bag was then dropped into a column containing the solution of foaming agent. When the water-soluble bag dissolved, nitrogen was evolved and foam formed in the column. The formation of foam caused the water to be carried up and out of the column.

Example II

The procedure described in Example I was employed, with the exception that an amino acid was used in place of the sulfamic acid. The amino acid was DL alanine and was added in an amount of 8.9 grams. Once again, foaming occurred when the water-soluble bag dissolved and caused the water in the column to be carried up the column.

Example III

The same procedure as that described in Example I was used, with the exception that a primary amine was substituted for the sulfamic acid. The primary amine was ethyl amine and was added in an amount of 4.5 grams. 5.0 grams of acetic acid was also added to the foam initiator composition. As in the previous examples, a foam was generated when the water-soluble bag dissolved which foam caused the water in the column to be carried up the column.

Example IV

The same procedure as that described in Example I was employed, except that an amide was substituted for sulfamic acid. The amide used was formamide and was added in an amount of 4.5 grams. Acetic acid was also added in an amount of 5.0 grams. When the water-soluble bag dissolved, a foam was formed which carried the water in the column up the column.

It will be readily apparent to those skilled in the art that various modifications may be made in the present invention without departing from the scope thereof. For example, foaming agents and foam initiators other than those specifically described herein may be used. While the present invention is particularly suitable for lightening the hydrostatic head on "drowned" gas or oil wells, it may also be used to remove water or other liquids, including oil and other organic liquids, from pipes, tanks, or the like.

Having fully described the present invention, it is to be understood that it is not to be limited to the specific details thereof, but is of the full scope of the appended claims.

We claim:
1. A method for treating subterranean wells containing aqueous liquid which comprises adding a foaming agent to the liquid in the well whereby the water and foaming agent are mixed, said mixing producing an aqueous solution of said foaming agent within the well, adding a foam initiator composition capable of evolving nitrogen to said solution in said well and allowing said foam initiator composition to evolve nitrogen whereby a foam comprising aqueous liquid and gas flows from the well.

2. The method of claim 1 wherein said well is an oil well.

3. The method of claim 1 wherein said well is a gas well.

4. The method of claim 1 wherein said foaming agent comprises a member selected from the class consisting of nonionic, anionic and cationic surface active agents and mixtures thereof.

5. A method for treating subterranean wells containing aqueous liquid which comprises adding a foaming agent to the liquid in said well whereby the liquid and foaming agent are mixed, said mixing producing an aqueous solution of said foaming agent within the well, adding a foam initiator composition to the solution in said well, said foam initiator comprising a composition selected from the group consisting of nitrous acid and compositions capable of forming nitrous acid and a composition selected from the class consisting of primary amines sulfamic acid, amides, amino acids and mixtures thereof, said foam initiator composition being capable of evolving nitrogen gas, and allowing said foam initiator composition to evolve nitrogen gas whereby a foam comprising aqueous liquid and gas flows from the well.

6. The process of claim 5 wherein said foam initiator composition comprises sulfamic acid.

7. The process of claim 5 wherein said foam initiator composition comprises a primary amine.

8. The composition of claim 5 wherein said foam initiator composition comprises an amide.

9. The process of claim 5 wherein said foam initiator composition comprises an amino acid.

10. The process of claim 5 wherein said foam initiator composition comprises a water-soluble amino acid which possesses a primary amino group.

11. The process of claim 5 wherein said well comprises a gas well.

12. The process of claim 5 wherein said well comprises an oil well.

13. The process of claim 5 wherein said foaming agent comprises a member selected from the class consisting of non-ionic, anionic and cationic surface active agents.

14. The process of claim 7 wherein said foam initiator composition comprises an acid.

15. The process of claim 8 wherein said foam initiator composition comprises an acid.

16. The process of claim 5 wherein the constituents of said foam initiator composition are enclosed in a water-soluble container at the time they are added to the liquid in the well.

17. The process of claim 16 wherein the constituents of said foam initiator composition are enclosed in separate water-soluble containers at the time they are added to the liquid in the well.

References Cited by the Examiner

UNITED STATES PATENTS

| | | | |
|---|---|---|---|
| 3,073,387 | 1/1963 | Dunning | 166—45 |
| 3,076,508 | 2/1963 | Lissant | 166—45 |
| 3,164,206 | 1/1965 | Sharp | 166—45 |
| 3,219,115 | 11/1965 | Hower et al. | 166—45 |

CHARLES E. O'CONNELL, *Primary Examiner.*

J. A. LEPPINK, *Assistant Examiner.*